(12) United States Patent
Xu (10) Patent No.: US 7,782,798 B2
(45) Date of Patent: Aug. 24, 2010

(54) METHOD FOR IDENTIFYING NODE REACHABILITY, METHOD FOR IDENTIFYING WHETHER A LINK IS AN EXTERNAL LINK, METHOD FOR CALCULATING A ROUTING, AND METHOD FOR DISSEMINATING NODE ADDRESS INFORMATION

(75) Inventor: Huiying Xu, Shenzhen (CN)

(73) Assignee: Huawei Technologies, Co., Ltd., Shenzhen (CN)

( * ) Notice: Subject to any disclaimer, the term of this patent is extended or adjusted under 35 U.S.C. 154(b) by 703 days.

(21) Appl. No.: 11/571,520

(22) PCT Filed: Jun. 9, 2006

(86) PCT No.: PCT/CN2006/001270

§ 371 (c)(1),
(2), (4) Date: Jan. 12, 2007

(87) PCT Pub. No.: WO2006/133633

PCT Pub. Date: Dec. 21, 2006

(65) Prior Publication Data

US 2007/0160039 A1    Jul. 12, 2007

(30) Foreign Application Priority Data

Jun. 15, 2005    (CN) .................... 2005 1 0077058

(51) Int. Cl.
*H04L 12/28*    (2006.01)
(52) U.S. Cl. .................. 370/255; 370/254; 370/389; 370/390; 370/395.5; 370/396; 370/397; 370/400; 370/409

(58) Field of Classification Search ............ 370/254, 370/255, 389, 390, 396, 397, 395.5, 400, 370/409
See application file for complete search history.

(56) References Cited

U.S. PATENT DOCUMENTS

| 6,147,971 | A | * | 11/2000 | Rochberger et al. | ......... 370/238 |
| 6,456,600 | B1 | * | 9/2002 | Rochberger et al. | ......... 370/255 |
| 6,473,408 | B1 | * | 10/2002 | Rochberger et al. | ......... 370/255 |

(Continued)

OTHER PUBLICATIONS

European Search Report corresponding to European Patent Application Serial No. 06752922.2 completed Aug. 21, 2008.

(Continued)

*Primary Examiner*—Dang T Ton
*Assistant Examiner*—Robert M Morlan
(74) *Attorney, Agent, or Firm*—Conley Rose, P.C.; Grant Rodolph (57) ABSTRACT

The present invention discloses a method for identifying node reachability, a method for identifying a link, a method for calculating a routing, and a method for disseminating node address information. In the method of the node address information dissemination, when the network is initiated, each node in the automatically switched optical network performs a node address aggregation process and an aggregation address dissemination process, and obtains and stores the aggregation address respectively. Therefore, any node in the network may judge whether the node and another node in the network are reachable to each other, and may further calculate the routing between the source and destination nodes pair. Moreover, the present invention also may determine whether any traffic engineering link in the multi-level ASON network is an external link or an internal link.

9 Claims, 5 Drawing Sheets

U.S. PATENT DOCUMENTS

| | | | | |
|---|---|---|---|---|
| 6,577,607 | B1* | 6/2003 | Mitts et al. | 370/310.1 |
| 2004/0085961 | A1* | 5/2004 | Coffell et al. | 370/392 |
| 2004/0136320 | A1* | 7/2004 | Frelechoux et al. | 370/229 |
| 2005/0089047 | A1* | 4/2005 | Ould-Brahim et al. | 370/395.53 |
| 2008/0170854 | A1* | 7/2008 | Li | 398/45 |

OTHER PUBLICATIONS

Drake et al., "Evaluation of existing Routing Protocols against ASON routing requirements draft-dimiri-ccamp-gmpls-ason-routing-eval-01.txt." IETF Standard-Working-Draft, Internet Engineering Task Force, IETF, CH No. 1, Mar. 1, 2005.

* cited by examiner

METHOD FOR IDENTIFYING NODE REACHABILITY, METHOD FOR IDENTIFYING WHETHER A LINK IS AN EXTERNAL LINK, METHOD FOR CALCULATING A ROUTING, AND METHOD FOR DISSEMINATING NODE ADDRESS INFORMATION

CROSS REFERENCES TO RELATED APPLICATIONS

This application is the U.S. national stage application of International Application No. PCT/CN2006/001270, filed Jun. 9, 2006, and entitled "Node Reachability Identification Method, Link Identification Method, Route Calculation Method and Node Address Information Diffusion Method" which claims priority to Chinese Patent Application No. 200510077058.7, filed Jun. 15, 2005.

FIELD OF THE INVENTION

The present invention relates to the optical network communication area, particularly relates to a method for identifying the node reachability, a method for identifying whether a Link is an external link, a method for calculating a routing, and a method for disseminating the node address information.

BACKGROUND OF THE INVENTION

The optical network is one of the basic networks in the whole telecommunication network and it has been developed rapidly in recent years and will become the physical basis of the NGN (Next Generation Network). The optical network system mainly includes SDH (Synchronous digital hierarchy)/Sonet (Synchronous Optical Network), a wavelength optical network and etc. The conventional optical network is a system based on the central management, in which the communication between the nodes of the network is carried out in a permanent connection manner. The permanent connection manner means that the service switching relations on all the nodes are manually configured in the conventional optical network system, and such configuration generally will not be amended again in a large optical network system once it is set.

The management plane calculates the connection path of the permanent connection in advance according to the connection requirement and the usage state of the network resource, and sends cross-connection command to every node through NMI-T (network management interface for the Transport Network) along the connection path so as to perform the uniform assignment and realize the path establishment. In the initial development of the optical network, the permanent connection manner has achieved a better effect due to its simple design and low cost. However, the establishment, maintenance and release of the optical connection in the permanent connection manner need to be intervened manually or by the network manage system. With the increasing quantity of the data services, such connection manner cannot assure that the optical network system has the dynamic and flexible characteristics.

For solving the problem that the permanent connection manner can not assure that the optical network system has the dynamic and flexible characteristics in the case of the increasing quantity of the data services, ITU-T (International Telecommunication Union—Telecommunication Standardization Sector) proposes an ASON (Automatically Switched Optical Network) architecture. The ASON architecture adds a control plane in the conventional optical network, and proposes a concept of switched connection. In the ASON architecture, the optical network node firstly obtains the local adjacency relationship between itself and other adjacent optical network nodes by the discovering function of partial links, floods the state of the node itself and links via the control plane, and receives the state issuances of other nodes in the network. As a result, each optical node has a "network map" describing an accurate topology of the network. There are various kinds of information in the "network map", such as nodes, links, resources and etc. When the user equipment or the management plane requires the node to establish the connection, the corresponding node uses the "network map" information obtained by itself to calculate a routing according to a certain routing algorithm, and uses signaling protocol to create a cross connection in all the nodes in the path so that a end-to-end connection is established.

In the ASON, each node employs the link state protocol to collect the "network map" information. The link state protocol can be only used when the network is not very large. With the expansion of the ASON, the network will be divided into a plurality of control domains. If the ASON further expands, the divided control domain will further be divided into a plurality of control domains, and eventually a multi-level ASON will be formed.

After the ASON is divided into a plurality of control domains, the procedure of establishing a connection path in a control domain is the same as that of establishing a connection path before the ASON is divided. However, when establishing one end-to-end connection path across several control domains, since each control domain is independent to each other and the nodes in each control domain do not know the "network map" information in other control domains besides that in their own domain, there is no way to calculate and establish the across-domain connection path according to the "network map" information of their own domain. Therefore, in the multi-level ASON, hierarchy routing is generally used to solve the problem of establishing an inter-domain connection path. During the procedure of establishing an inter-domain connection path by hierarchy routings, as for each high-level control domain, an adjacent control domain with a lower level is represented as an abstract node, and the links between the control domains of lower level are represented as links between the abstract nodes, and the links between the nodes in control domains of a lower level are invisible to the high-level control domain. In the high-level control domain, a similar procedure is used to realize the dissemination of link state information among the abstracts nodes, so that each abstract node in the high-level control domain can obtain the network topology information of current level, i.e. each abstract node can obtain the "network map" information of current level.

When the ASON network only has one control domain, any node has the topology information of the whole ASON network. Therefore, it is easy to determine whether another node in the network is reachable. However, in the multi-level ASON network, a node only has the outline of the whole network. The inventor finds some problems when invention on progressing as below: how to effectively determine whether another node in the network is reachable is one of main problems to be urgently solved at present. Meanwhile, on a node in the multi-level ASON network, how to effectively identify whether a link is internal link or external link also becomes a problem to be solved.

There is a method for identifying external links in the multi-level ASON network, i.e. a feeding down RC ID (routing controller identification) method. In the method, the nodes of ASON network respectively store the RC ID of the upper-layer network abstract node abstracted from the control domain to which the nodes belong. Then, the nodes obtain RC IDs, which are stored in the opposite-end node, of each layer of network abstract node through the interaction of the respectively stored RC IDs of each level of network abstract node with the opposite-end nodes. By comparing RC IDs of each layer of network abstract node stored by nodes with those of corresponding level of network abstract nodes stored in the opposite-end node, it can be determined that whether the link between a node and the opposite-end node is an external link or an internal link. Although said feeding down RC ID method enables each level of control domain in the multi-level ASON network to identify the external link among the nodes of the same level, it may not enable a node in the network to judge whether the node and other node in the network are reachable to each other. The method does not employ a concept of aggregation address, so it may not calculate the routing of a connection hierarchically.

SUMMARY OF THE INVENTION

One embodiment of the present invention provides a method for identifying node reachability in an automatically switched optical network, which includes:

performing node address aggregation process and feeding aggregation address up/down, and obtaining corresponding aggregation address respectively feeding aggregation address up/down process;

searching a routing controller identification (RC ID) which comprises a destination node address and belongs to the lowest level by using the aggregation address obtained by the source node, according to selected source-destination nodes in the automatically switched optical network; and determining that the source and destination nodes pair is reachable to each other if an RC ID containing the source node and belonging to the same domain as the RC ID which contains the destination node and belongs to the lowest level is obtained according to the aggregation address obtained by the source node.

Preferably, searching a routing controller identification is completed by the source node.

Preferably, each node in the automatically switched optical network performing a node address aggregation process and a feeding aggregation address up/down process and obtaining corresponding aggregation addresses respectively specifically include:

a speaker node of a control domain to which the node belongs performing the node address aggregation process and the aggregation address dissemination process; and each node storing all the received aggregation addresses in the reachable address list of the node.

Preferably, each node in the automatically switched optical network performing a node address aggregation process and a feeding aggregation address up/down process and obtaining corresponding aggregation addresses respectively specifically include:

adding a top-level type-length-value (TLV) for identifying the node address and its corresponding sub-TLV for identifying the attribute, parameter and reachable address of the node in a routing protocol;

attaching the top-level TLV and its corresponding sub-TLV to the link state advertisement of the routing protocol, and disseminating the reachable address information of the node to other nodes in the network via the link state advertisement; and updating the reachable address list accordingly by the node after receiving the fed up/down reachable address information.

Preferably, the top-level TLV for identifying the node address includes one sub-TLV for identifying the attribute and parameter of the node and at least one sub-TLV for identifying the node reachable address.

One embodiment of the present invention provides a method for identifying whether a link is an external link or an internal link in an automatically switched optical network, which includes:

performing node address aggregation process and aggregation address dissemination process through a routing protocol, and obtaining aggregation addresses respectively;

for a traffic engineering link whose attribute is unknown on a node, searching a corresponding Ancestor RC ID and a Link ID when a traffic engineering link becomes an internal link, according to the aggregation address obtained by the node;

determining that a traffic engineering link is an external link, if the obtained Ancestor RC ID is different from actual Local endpoint of the traffic engineering link, or the obtained Link ID is different from actual Remote endpoint of the traffic engineering link, otherwise, determining that the traffic engineering link is an internal link.

Preferably, searching a corresponding Ancestor RC ID and a Link ID when a traffic engineering link becomes an internal link specifically includes: when receiving the verification message of the traffic engineering link, according to the aggregation address list of the node, the node searching the corresponding Ancestor RC ID and Link ID when the traffic engineering link becomes an internal link.

Preferably, the above identifying method further includes, setting the Ancestor RC ID and Link ID of the traffic engineering link as 0 and labeling the attribute of the traffic engineering link as unknown when the node does not find the Ancestor RC ID and Link ID corresponding to the traffic engineering link.

Preferably, the above identifying method further includes, searching the Ancestor RC ID and Link ID corresponding to the traffic engineering link whose attribute is labeled as unknown, and determining whether the traffic engineering link is an external link or an internal link.

One embodiment of the present invention provides a method for calculating a routing between the nodes in an automatically switched optical network, which includes, performing node address aggregation process and aggregation address dissemination process, and obtaining the aggregation addresses respectively;

according to the selected source and destination nodes pair in the automatically switched optical network, searching the corresponding Ancestor RC ID and Link ID when a link between source and destination nodes pair becomes an internal link by using the aggregation address obtained by the source node; and calculating a routing between the source and destination nodes pair according to the obtained Ancestor RC ID and Link ID.

Preferably, the aggregation address is stored in the reachable address list; and the method further includes:

returning the information that the source and destination nodes pair is not reachable to each other when the Ancestor RC ID or Link ID can not be obtained according to the reachable address list of the source and destination nodes pair.

Preferably, calculating a routing between the source and destination nodes pair specifically includes:

a routing calculating module calculating a routing between the Ancestor RC ID and the Link ID by using the topology data held by each node according to the obtained Ancestor RC ID and RC ID;

adding the calculated routing to a routing list of the routings between the current the source and destination nodes pair; and the routing calculating module further calculating the routing between the first two neighboring nodes in the routing list, adding the calculated routing to the routing list until the first two nodes in the routing list are in one routing domain, and obtaining a final routing between the source and destination nodes pair.

Preferably, the routing calculating module further calculating the routing between the first two neighboring nodes in the routing list, adding the calculated routing to the routing list until the first two nodes in the routing list are in one routing domain, and obtaining a final routing between the source and destination nodes pair specifically include: the routing calculating module, according to the reachable address list of the source node, searching the corresponding Ancestor RC ID and Link ID end when the link between the neighboring nodes becomes an internal link, and calculating the routing between the neighboring nodes according to the obtained Ancestor RC ID and the Link ID.

One embodiment of the present invention provides a method for disseminating the information of the node address in an automatically switched optical network including a plurality of nodes. The method includes:

performing node address aggregation process and aggregation address dissemination process, and obtaining and storing the aggregation address respectively.

Preferably, the aggregation address is stored in a reachable address list.

Preferably, the method for disseminating the information of the node address specifically includes:

adding a top-level TLV for identifying the node address and its corresponding sub-TLV in a routing protocol;

attaching the top-level TLV and its corresponding sub-TLV to the link state advertisement of the routing protocol, and disseminating the reachable addresses information of the node to other nodes in the network via the link state advertisement; and after receiving the reachable address information fed up/down by other nodes, the node updating the reachable address list accordingly.

Preferably, the top-level TLV includes one sub-TLV for identifying an attribute or parameter of the node and at least one sub-TLV for identifying the reachable address of the node.

Preferably, the sub-TLV for identifying the attribute or parameter of the node includes the information on a network element ID, a level number, a flag of DDRP nodes, a RC ID of the node, and an ID of the domain where the current RC locates; and the sub-TLV for identifying the information of the reachable addresses includes a node_id, an address length, and a piece of information indicating an alignment in 4 bytes.

One embodiment of the present invention provides a method for disseminating node address information in an automatically switched optical network which includes a plurality of nodes. The method includes:

adding a top-level type-length-value (TLV) for identifying node address and its corresponding sub-TLV in a routing protocol; and attaching the top-level TLV of the node to link state advertisement of the routing protocol, and disseminating the address information of the node to other nodes in the network via the link state advertisement.

It can be seen from the above technical solutions that some embodiments of the present invention have one or more of these benefits: after the multi-level ASON network is initiated, the present invention firstly performs the node address aggregation process and the aggregation address dissemination process, and then feeds up the external link in each level. Therefore, any node in the network may determine whether the node and another node in the network are accessible to each other, and may further calculate the routing between the source and destination nodes pair. Moreover, the present invention also may determine whether any of TE (traffic engineering) link in the multi-level ASON network is an external link or internal link.

DETAILED DESCRIPTION OF THE INVENTION

The core of the embodiments of the invention is searching for the Ancestor RC (Ancestor RC ID) and link ID (Link ID) of a link between the source and destination nodes pair by querying a reachable address list of the source node according to the selected source and destination nodes pair. If the Ancestor RC and link ID can be obtained, the source and destination nodes pair is reachable to each other.

After the multi-level ASON network system completes initiation, each node can obtain a reachable address list including the address information of all the nodes that may be obtained by each node. The reachable address list is stored in the system and it may be aggregated. For example, assuming the address that may be obtained by node A includes 129.9.0.1/32 and 129.9.1.0/24, they are included in the reachable address list of node A.

Figure 1:
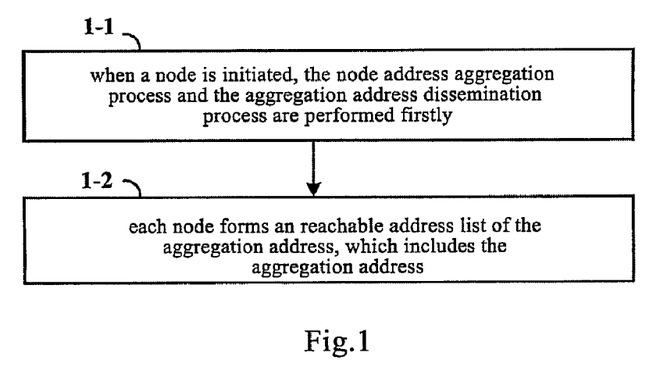
FIG. 1 is a flowchart showing the node address aggregation process and the aggregation address dissemination process when the node is initiated according to an embodiment of the present invention.

The embodiments will be described in detail with reference to the attached drawings. In an embodiment of the present invention, when a node is initiated, the node address aggregation process and the aggregation addresses dissemination process are firstly performed, and then each node forms a reachable address list. FIG. 1 shows a specific processing flow of the above procedure, which includes the following steps:

Step 1-1, when a node is initiated, the routing protocol firstly performs the address aggregation process and the aggregation address dissemination process.

When each node in the multi-level ASON network is initiated, it firstly performs the reachable address dissemination process, and feeds up and feeds down the aggregation addresses when the Speaker (agent) node completes the address aggregation. Each node establishes an aggregation address information list respectively.

The aggregation address is an address whose identification is aggregated. For example, 129.9.0.16/29 identifies an aggregation of 8 addresses. Any two of all the addresses identified by a same aggregation address is reachable to each other.

Figure 2:
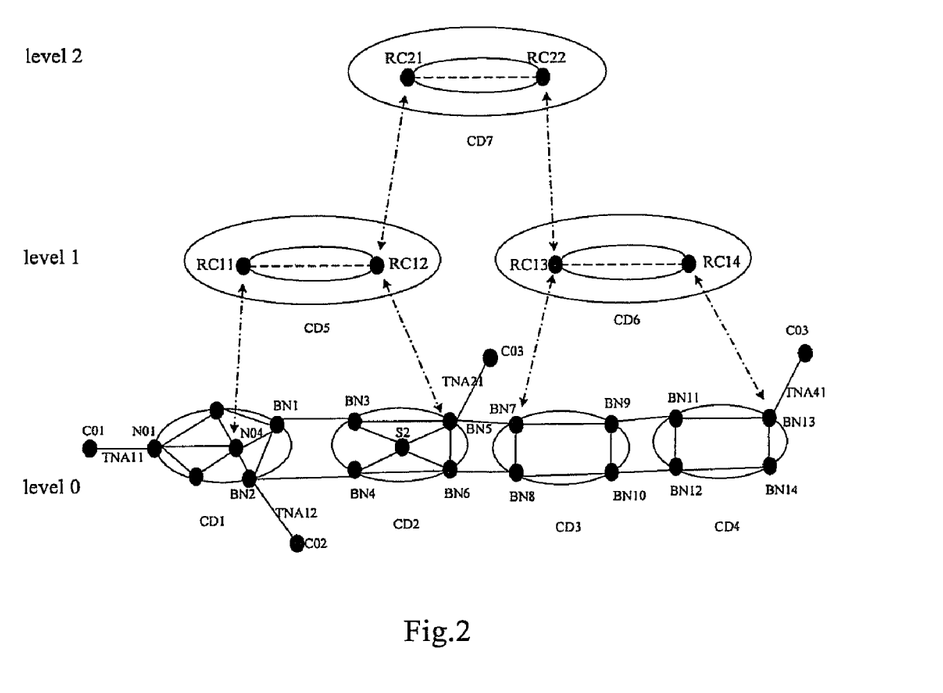
FIG. 2 is a schematic diagram of the multi-level ASON network in an embodiment according to the present invention.

For example, in level 0 of the multi-level ASON network as shown in FIG. 2, each node in Domain CD1, CD2 domain, CD3 domain and CD4 domain generally floods the represented reachable addresses. The reachable addresses represented by each node in level 0 are their own node_id. The aggregation of node addresses of the represented domain is completed on the Speaker node of each domain, and the aggregation address NODE_AGG_CD1 (the aggregation address identifying all the nodes in domain CD1), NODE_AGG_CD2 (the aggregation address identifying all the nodes in domain CD2), NODE_AGG_CD3 (the aggregation address identifying all the nodes in domain CD3), NODE_AGG_CD4 (the aggregation address identifying all the nodes in domain CD4) are formed respectively.

Domain CD1 is represented by node RC11 in level 1, and the RC ID of RC11 is represented by RC11, so the RC to which the aggregation address NODE_AGG_CD1 belongs is RC11. Similarly, the RC to which the aggregation address NODE_AGG_CD2 belongs is RC12; the RC to which the aggregation address NODE_AGG_CD3 belongs is RC13; and the RC to which the aggregation address NODE_AGG_CD4 belongs is RC14.

In the multi-domain ASON network, each control domain has a Speaker node. The Speaker node is a particular node, and in this node, an instance of routing protocol in the upper level network and an instance of routing protocol in current level network may be running at the same time. Therefore, the Speaker node can has a function of feeding up and feeding down the information. The Speaker node performs the information flooding in its control domain via LSA (link state advertisement) message. Accordingly, the aggregation addresses NODE_AGG_CD1 and NODE_AGG_CD2 are fed up to domain CD5 of level 1 via the Speaker node, and the aggregation addresses NODE_AGG_CD3 and NODE_AGG_CD4 are fed up to domain CD6 of level 1 via the Speaker node.

In the level 1 and level 2 of the multi-level ASON network shown in FIG. 2, the similar node address aggregation process and the aggregation address dissemination process will be performed.

Step 1-2, each node forms a reachable address list including the aggregation address.

After the aforementioned node address aggregation process and the aggregation address dissemination process, each node in the multi-level ASON network can hold some aggregation addresses respectively. For example, the aggregation addresses held by each node in domain CD1 are shown in Table 1:

TABLE 1 the aggregation address information held by each node in domain CD1

| RC to which a node belongs | Node_id aggregation address the corresponding RC represented |
|---|---|
| RC11 | NODE_AGG_CD1 (aggregation Address of CD1node_id) |
| RC12 | NODE_AGG_CD2 (aggregation Address of CD2node_id) |
| RC21 | NODE_AGG_CD1_CD2 (aggregation addresses of CD1 and CD2 node_id) |
| RC22 | NODE_AGG_CD3_CD4 (aggregation addresses of CD3 and CD4 node_id) |

Then the aggregation address held by each node is added into the reachable address list of the node. Therefore, the reachable address list of each node includes the address information such as the aggregation address, the TNA (Transport Network Assigned) address and etc.

In the multi-level ASON network, the reachable addresses of each node may be represented by the reachable address TLV (Type/Length/Value). In order to better identify the reachable addresses of each node, the present embodiment adds a top-level TLV and the corresponding sub-TLV for each node for identifying the information such as the address, attribute, reachable addresses of the node and etc. The top-level TLV and corresponding sub-TLV for each node are defined as follows:

1. Node_TLV: the top-level TLV of the node address for identifying the node addresses. The top-level TLV includes two sub-TLVs, i.e., Node_INFO_SUB_TLV, and Node_Aggr_Sub_TLV.

2. Node_INFO_SUB_TLV: the sub-TLV of top-level TLV of the node address for identifying the attribute and some parameter information of the nodes.

The information includes:

| Definition of data item | length (byte) | Description of data item |
|---|---|---|
| one_id | 4 | network element ID |
| level | 4 | level number |
| ddrp_flag | 4 | The flag to show whether it is a DDRP node |
| rc_id | 4 | RC ID of the node |
| area_id | 4 | Area ID of the domain to which the current RC belongs |

3. Node_Aggr_Sub_TLV: the sub-TLV of top-level TLV of the node address for identifying the reachable address of the node. There can be a plurality of Node_Aggr_Sub_TLVs under a Node_TLV. Each Node_Aggr_Sub_TLV includes the information as follows:

| Definition of data item | length (byte) | Description of data item |
|---|---|---|
| node_id | 4 | storing the node_id information |
| Prefix | 1 | address length |
| Resverved | 3 | aligning in 4 bytes |

Then, the present embodiment attaches the added top-level TLV and its corresponding sub-TLV of each node to No. 10 LSA of the routing protocol. Reachable addresses of each node firstly are disseminated in the domain via the LSA, then all the reachable addresses in the domain are aggregated together and sent to the upper level network till the top level network. After each node received the reachable address information disseminated by other nodes via the LSA, it may update its reachable address list accordingly.

Figure 3:
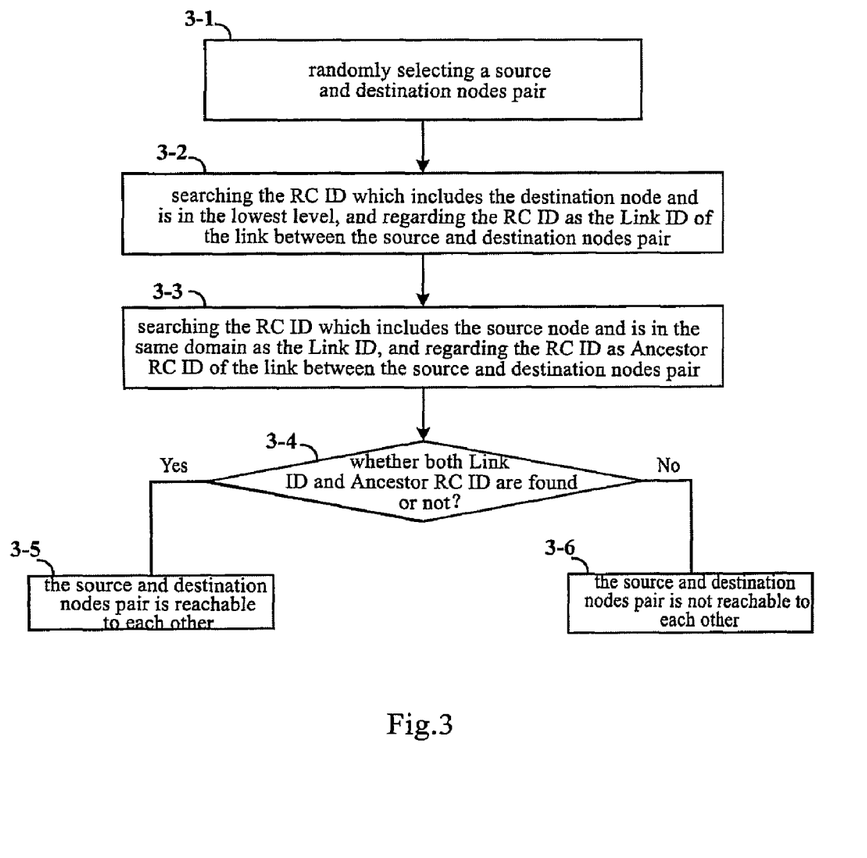
FIG. 3 is a flowchart of an identification method of node reachability in the automatically switched optical network according to an embodiment of the present invention.

According to the aggregation address in the reachable address list of each node in the multi-level ASON network, an embodiment of the present invention provides a method for identifying the reachability of the node in the automatically switched optical network. FIG. 3 shows a specific processing flow of the method. Specifically, the method includes:

Steps 3-1: a pair of source and destination nodes pair is randomly selected.

If any node of level 0 in the multi-level ASON network is regarded as a source node, a destination node is randomly designated, and whether the two nodes are reachable to each other can be judged.

Step 3-2: the node searches the RC ID, in which the reachable addresses list contains the destination node address and the level the RC belongs to is the lowest one, so considers the RC ID as the Link ID of the link between the source and destination nodes pair.

Firstly, it needs to search in the source node for the corresponding RC ID of the Remote end point in the lowest level with respect to the destination node.

The specific operation is that the source node searches the RC ID which includes the address of the Remote endpoint and is in the lowest level according to the reachable address list of the source node. If the source node does not find the address of the Remote endpoint in its reachable address list, it returns a failure report showing that it is not reachable between the source node and the destination node, and thereby the process of determining whether the source node and the destination node are reachable to each other ends.

If the source node finds the address of the Remote endpoint in its reachable address list, the RC ID including the address of the Remote endpoint and being in the lowest level is determined and accordingly considered as the Link ID of the link between the source and destination nodes pair. Then the procedure proceeds to step 3-3.

For example, in the multi-level ASON network shown in FIG. 2, if the source node is node N01 and the destination node is node BN13, according to the aggregation address information in the reachable address list of node N01, it can be obtained at node N01 that the RC ID of the lowest level whose reachable address contains BN13 is RC 22, and accordingly RC 22 is used as the Link ID of the link between node N01 and node BN13.

Step 3-3: the source node searches the RC ID which includes the source node and is in the same domain as the Link ID, and considers the RC ID as the Ancestor RC of the link between source and destination nodes pair.

The source node searches the RC ID whose reachable address contains the address of the Local endpoint according to its reachable address list and the RC is in the same domain as the Link ID. If the RC ID is obtained, it is considered as the Ancestor RC of the link between the source and destination nodes, and then the procedure proceeds to step 3-4.

If the Ancestor RC is not found, a failure report is returned showing that the source node and the destination node are not reachable to each other, and the process of determining whether the source and destination nodes pair is reachable to each other ends.

For example, referring to the example in Step 3-2, in the multi-level ASON network shown in FIG. 2, if the source node is node N01 and the destination node is node BN13, according to the aggregation address in the reachable address list of node N01, the RC IDs can be obtained by node N01 are RC11 and RC21 whose reachable addresses contains the Local endpoint, and RC11 and RC21 is in one domain. Therefore, RC21 is the Ancestor RC of the link between node N01 and node BN13.

Step 3-4: determine whether both of Link ID and Ancestor are found.

If the Link ID and Ancestor RC of the link between the source and destination nodes pair are found, the procedure proceeds to step 3-5; otherwise, the procedure proceeds to step 3-6.

Step 3-5: the source and destination nodes pair is reachable to each other.

If the Ancestor RC and Link ID corresponding to the source and destination nodes pair are found according to the given addresses of source and destination nodes pair through step 3-3 and step 3-4, it may be conducted that it is reachable between the source and destination nodes pair.

Also referring to the example in the step 3-2, in the multi-level ASON network shown in FIG. 2, if the source node is node N01 and the destination node is node BN13, by performing step 3-2 and step 3-4, it can be obtained that RC11 and RC21 are the Ancestor RC and Link ID of the link between node N01 and node BN13 respectively, and node N01 and node BN13 is connective between RC21 and RC22 of CD7, which means that N01 and BN13 are reachable to each other.

Step 3-6, the source and destination nodes pair is not reachable to each other.

If the Ancestor RC and Link ID corresponding to the source and destination nodes pair are not found according to the given addresses of source and destination nodes pair through step 3-3 and step 3-4, it may be conducted that it is not connective between the source and destination nodes pair, that is, the source and destination nodes pair is not reachable to each other.

Till now, the flow of the method for identifying the node reachability in the automatically switched optical network ends.

Figure 4:
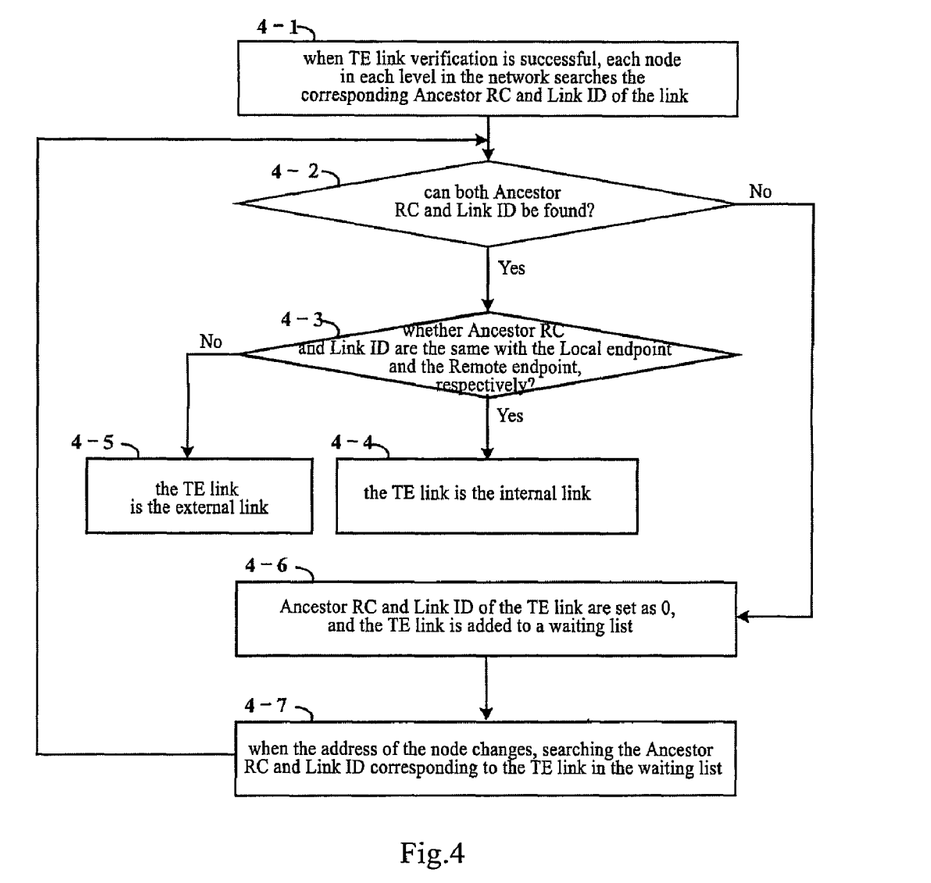
FIG. 4 is a flowchart of a method for identifying whether a link is an internal link or external link in the automatically switched optical network according to an embodiment of the present invention.

According to reachable address list of each node in multi-level ASON network, an embodiment of the present invention also provides a method for identifying the external link type in automatically switched optical network. The specific processing flow of the method is shown in FIG. 4, which includes the following steps:

Step 4-1: after the verification of the TE link is successful, each node in each level of the network searches the corresponding Ancestor RC and Link ID when the TE link becomes internal link to which the node belongs.

In the multi-level ASON network, just after the system is initiated, the state of the TE link in the network is Down (unusable), and the TE link can not be used by the services. After the verification of the TE link is successful, the state of the TE link will become to Up (usable), and at this time, the TE link may be used by the services.

After the verification of the TE link is successful, each node of each level of ASON network searches the Ancestor RC and Link ID corresponding to the TE link, and performs the corresponding processes respectively according to the search result. Then the procedure proceeds to step 4-2.

Step 4-2: determine whether the Ancestor RC and Link ID can be found, if found, the procedure proceeds to step 4-3, otherwise, proceeds to step 4-6.

Step 4-3, determine whether the Local endpoint (actual local endpoint) is the same as the Ancestor RC corresponding to the TE link in the same level, whether the Remote endpoint (actual remote endpoint) is the same as the Link ID corresponding to the TE link in the same level. If same, the procedure proceeds to step 4-4, otherwise proceeds to step 4-5.

Step 4-4, if both Ancestor RC and Link ID are found, and the Local endpoint (actual local endpoint) is the same as Ancestor RC, the Remote endpoint (actual remote endpoint) is the same as the corresponding the TE link Link ID, the TE link is determined as internal link.

For the internal link, the TE link is not fed up, and its LSA is disseminated only in the current domain.

Step 4-5: if both Ancestor RC and Link ID are found, and the found Ancestor RC is not the same as the local endpoint (actual local endpoint) and the Link ID is not the same as the Remote endpoint (actual remote endpoint), determine that the TE link is an external link.

For the external link, the LSA of the TE link is advertised in its domain and the TE link is fed up and added into a feed-up list.

Step 4-6: the Ancestor RC and Link ID of the TE link are set as 0, and the TE link is not fed up and is added into a waiting list.

The waiting list is used for recording all the TE links whose Ancestor RC and Link ID are not found.

Step 4-7: when the node address changes, the node searches the Ancestor RC and Link ID corresponding to the TE link in the waiting list, and the procedure returns to step 4-2.

In the multi-level ASON network, each time when the node address changes, each node of each level searches the Ancestor RC and Link ID corresponding to each TE link in the waiting list. If both Ancestor RC and Link ID are found, the TE link is deleted from the waiting list, and then the procedure returns to step 4-2.

Particularly, when the state of the TE link changes from Up to Down in the multi-level ASON network, it is to be determined whether the TE link is in the feed-up list. If so, the feeding up process is performed for the upper level network and a request for deleting the TE link is sent to the upper level network.

When the TE link updates, it is to be determined whether the TE link is in the feed-up list. If so, the feeding up process is performed for the upper level network and a request for updating the TE link is sent to the upper level network.

When the TE link is deleted, it is to be determined whether the TE link is in the feed-up list. If so, the feeding up process is performed for the upper level network and a request for deleting the TE link is sent to the upper level network.

The upper level network performs the corresponding operations according to the dissemination rules.

In the multi-level ASON network, after speaker node receives the feed-up topology from the lower node, it floods the information (LSA) in the domain it belongs to. Other Speaker node receiving the information further feeds down the information to the corresponding lower level speaker. The speaker node disseminates the information only in its control domain. For example, in the multi-level ASON network shown in FIG. 2, after the Speaker node S2 in CD2 feeds up the external links, i.e., BN5-BN7 and BN6-BN8, to the Speaker node RC12 in CD5, RC12 disseminates the links in CD5, and RC11 will receive these information and feed down to N04 in CD1. N04 will also disseminate the links in CD1.

Till now, the specific processing flow of the method for identifying the external link in the automatically switched optical network ends.

Therefore, in the multi-level ASON network, after the nodes in the network are initiated, by performing the above operations, such as the node address aggregation process, the TE link verification process, and the TE link feeding up/down process, each node has an outline of the topology of the whole ASON network.

Figure 5:
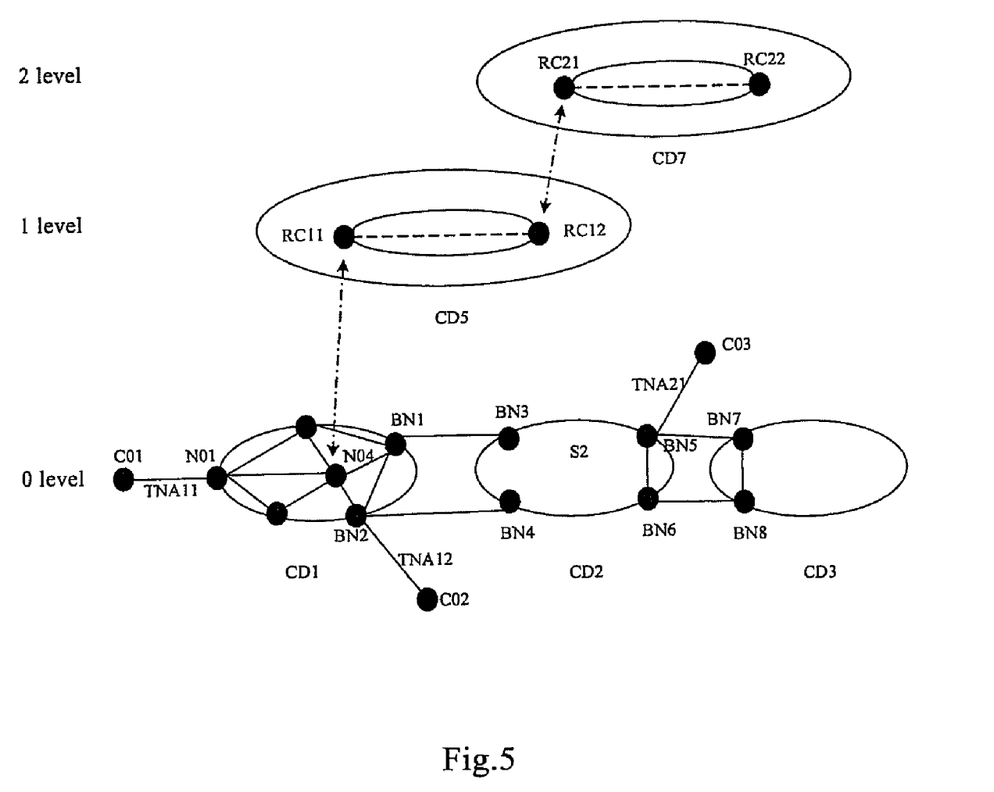
FIG. 5 is a schematic diagram of the network topology acquirable for each node in CD1 after the multi-level ASON network in an embodiment of the present invention is initiated.

For example, in the multi-level ASON network shown in FIG. 2, after the nodes in the network are initiated, if the above operations such as the node address aggregation process, the TE link verification process, and the TE link feeding up/down process are performed, the outline of the network topology is visible to each node in CD1, as shown in FIG. 5.

The topology data held by each node in CD1 are as follows:

A. All the intra-domain TE links and nodes in Domain CD1;

B. TE link data fed down by the higher level network as shown in Table 2;

TABLE 2

| | | | | | | |
|---|---|---|---|---|---|---|
| information list of the fed down TE link received by each node in CD1 | | | | | | |
| Advertising Router ID | Link ID sub-TLV | Local node ID sub-TLV | Remote node ID sub-TLV | Link local identifier sub-TLV | Link remote identifier sub-TLV | Ancestor RC ID sub |
| N04 | RC12 | BN1 | BN3 | Actual local interface index | Actual local interface index | RC11 |
| N04 | RC12 | BN2 | BN4 | Actual local interface index | Actual local interface index | RC11 |
| N04 | RC22 | BN5 | BN7 | Actual local interface index | Actual local interface index | RC21 |
| N04 | RC22 | BN6 | BN8 | Actual local interface index | Actual local interface index | RC21 |

C. data of the aggregation address fed down by the high level network as shown in table 3;

TABLE 3

| | |
|---|---|
| information table of the fed down aggregation addresses received by each node in CD1 | |
| RC | Node_id aggregation address corresponding to RC |
| RC11 | NODE_AGG_CD1 (aggregation address of node_id in CD1) |
| RC12 | NODE_AGG_CD2 (aggregation address of node_id in CD2) |
| RC21 | NODE_AGG_CD1_CD2 (aggregation address of node_id in CD1 and CD2) |
| RC22 | NODE_AGG_CD3_CD4 (aggregation address of node_id in CD3 and CD4) |

The reachable address list of a node is a part of the topology data held by each node. The topology data held by each node include not only the reachable address list information (including the aggregation address, TNA address), but also the topology data of all the TE links seen by the node.

Figure 6:
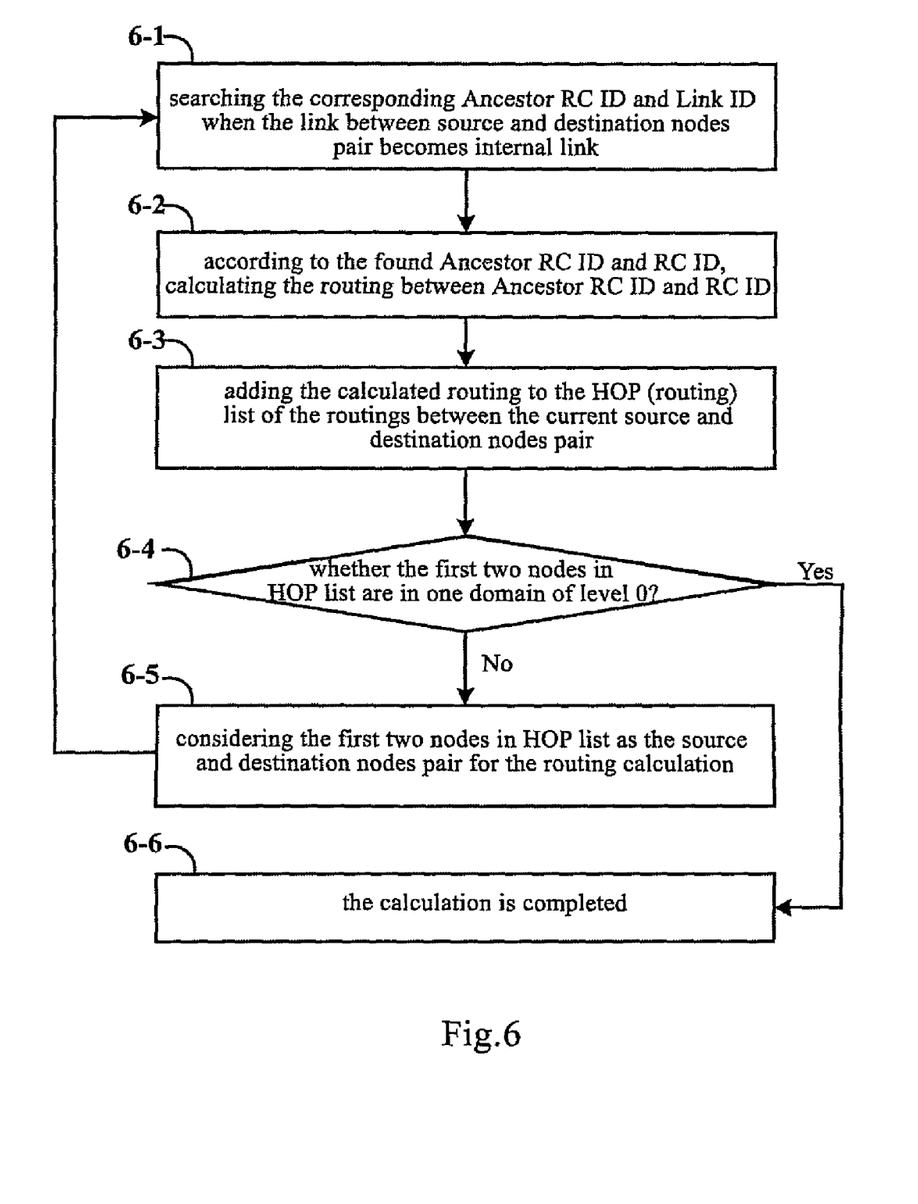
FIG. 6 is a flowchart of a computation method for the routing between any two of nodes in the automatically switched optical network according an embodiment of to the present invention.

According to the reachable address list of each node in the multi-level ASON network, an embodiment of the present invention also provides a method for calculating the routing between nodes in the multi-level ASON network. The specific processing flow of the method is shown in FIG. 6, which includes the following steps:

Step 6-1: the node searches the corresponding Ancestor RC ID and Link ID when the Ancestor RC ID and Link ID is within a domain.

According to the selected source and destination nodes pair whose routing needs to be calculated in the automatically switched optical network, the node searches the corresponding Ancestor RC ID and Link ID when the Ancestor RC ID and Link ID become in one domain by using the reachable address list of the source and destination nodes pair.

The specific searching procedure is the same as that of the method for identifying the node reachability in the automatically switched optical network.

Step 6-2: according to the found Ancestor RC ID and Link ID, the node calculates the routing between the Ancestor RC ID and Link ID.

According to the found Ancestor RC ID and Link ID through the source and destination nodes pair, the routing calculation module calculates the routing between the Ancestor RC ID and Link ID by using the TE link topology data included in the topology data held by each node.

Also referring to the example in the step 3-2, the routing calculation module calculates the routing of RC21>RC22, the calculation result is BN5→BN7 by using the TE link topology data included in the topology data held by node RC21 and node RC22.

Step 6-3: the node adds the calculated routing into the HOP (routing) list of the routings between the current source and destination nodes pair.

The HOP list is a routing list indicating the corresponding destination, for example, if the path from A to Z is A, B, C, Z, the list is called a HOP list of the routings between A and Z. Then the routing between the Ancestor RC ID and Link ID calculated by the routing calculation module is added into the HOP list of the routings between the current source and destination nodes pair.

Also referring to the example in the step 3-2, if the HOP list of the routings between the current source and destination nodes pair is: N01→BN13 and the calculated routing is BN5→BN7, after BN5→BN7 is added into N01→BN13, the HOP list of the routings between the source and destination nodes pair is N01→BN5→BN7→B13.

Step 6-4: it is to be determined that whether the first two nodes in the HOP list are in one domain of level 0.

The routing calculation module determines whether the first two nodes in the HOP list of the routings between the current source and destination nodes pair is in one domain of level 0, if yes, the procedure proceeds to step 6-6, otherwise, proceeds to step 6-5.

Step 6-5: the first two nodes in the HOP list are considered as the source and destination nodes pair for the routing calculation.

The routing calculation module regards the first two neighboring nodes in the current HOP list as the source and destination nodes pair for the routing calculation in the next step, and calculates the routing between the two nodes. Then the procedure proceeds to Step 6-1.

Step 6-6: the calculation completes.

If the first two nodes in the HOP list of the routings between the current source and destination nodes pair is in one domain of level 0, the procedure of the routing calculation between the assigned source and destination nodes pair ends. The HOP list of the routings between the current source and destination nodes pair is the routing between the assigned source and destination nodes pair. According to the HOP list, the connection between the source and destination nodes pair may be established.

Also referring to the example in the step 3-2, the eventually obtained HOP list of the routings between N01→BN13 is: N01→N04→BN1→BN3→BN5→BN7→BN13.

Till now, the specific processing flow of the method for calculating the routing between nodes in the automatically switched optical network ends.

Though illustration and description of the present invention have been given with reference to preferred embodiments thereof, it should be appreciated by ordinary personnel skilled in the art that various changes in forms and details can be made without deviation from the spirit and scope of this invention as defined by the appended claims.

The invention claimed is:

1. A method for identifying node reachability in an automatically switched optical network (ASON), the ASON comprising at least three control domains (CDs), each of the CDs comprising one speaker node, the ASON further comprising at least two levels, a first level network being located on a bottom level of the ASON, a second level network being located on a level above the first level network, the first level network comprising at least two of the CDs, each of the CDs of the first level network comprising nodes, the second level network comprising at least one of the CDs, each of the CDs of the second level network comprising routing controllers (RCs); and, a RC that is located within a network representing a CD of one level lower than the network, there being a one-to-one correspondence between the CD and the RC;

the method comprising:
disseminating, by each of nodes that are located within a first CD of the first level network, a node_id of each of the nodes in the first CD;

obtaining, by a speaker node of the first CD, the node_id of each of the nodes of the first CD, forming an aggregation address of the first CD, feeding aggregation address information of the first CD to a first RC of the second level network, in accordance with a one-to-one correspondence between the first CD and the first RC, and disseminating the aggregation address information of the first CD in the first CD;

disseminating, by the first RC that is located within a second CD of the second level network, the aggregation address information of the first CD in the second CD, obtaining an aggregation address of a third CD of the first level network, the third CD corresponding to a second RC that is located within the second CD, feeding aggregation address information of the third CD to the speaker node of the first CD;

disseminating, by the speaker node of the first CD, the aggregation address information of the third CD in the first CD;

obtaining, by each of the nodes of the first CD, aggregation address information that contains the aggregation address information of the first CD and the aggregation address information of the third CD, forming a reachable address list; and determining a source node and a destination node that are located within the first level network, searching for a RC ID and another RC ID by using a reachable address list of the source node, the RC ID corresponding to an aggregation address that contains a destination node address and belonging to a CD of the lowest level network, the another RC ID corresponding to an aggregation address that contains a source node address and belonging to the CD of the lowest level network, and determining that the source node and destination nodes are reachable to each other;

wherein the speaker node disseminates the aggregation address information of the first CD in the first CD comprising:

adding a top-level type-length value (TLV) that attaches the aggregation address information in No. 10 link state advertisement of a routing protocol, the top-level TLV comprising one sub-TLV for identifying attribute and parameter information and at least one sub-TLV for identifying address information; wherein the attribute and parameter information comprise network element ID, level number, a flag to show whether it is a DDRP node, RC ID of a node, area ID of a domain to which the current RC belongs, and the address information comprise storing a node_id information, address length; and disseminating the aggregation address information by using the No. 10 link state advertisement of the routing protocol.

2. The method according to claim 1, wherein the ASON comprises a third level network, the third level network located on a top level of the ASON, the third level network comprises at least one of the CDs, and each of the CDs of the second level network comprises RCs;

the method further comprising:

obtaining, by a speaker node of the second CD, an aggregation address of each of RCs that are located within the second CD, feeding aggregation address information of the second CD to a third RC of the third level network, in accordance with a one-to-one correspondence between the second CD and the third RC;

disseminating, by the third RC that is located within a fourth CD of the third level network, the aggregation address information of the second CD in the fourth CD, obtaining an aggregation address of a fifth CD of the second level network, the fifth CD corresponding to a fourth RC that is located within the fourth CD, feeding aggregation address information of the fifth CD to the speaker node of the second CD.

3. The method according to claim 1, wherein the source node searches for the RC ID and the another RC ID.

4. The method according to claim 1, wherein the reachable address list comprises aggregation addresses and transport network assigned (TNA) node addresses.

5. The method according to claim 1, the method further comprising: calculating a routing between the source node and the destination node, in accordance with the RC ID and the another RC ID.

6. The method according to claim 5, wherein calculating the routing between the source node and the destination node comprises:

calculating, by a routing calculating module, a routing between the RC ID and the another RC ID by using the reachable address list of the source node, adding the calculated routing between the RC ID and the another RC ID to a routing list that contains the source node and the destination node, and further calculating a routing between a first two nodes of the routing list, adding the calculated routing between the first two nodes to the routing list until a first two nodes of the routing list are in one CD, and obtaining the routing between the source node and the destination node.

7. A method for identifying whether a link is an external link or an internal link in an automatically switched optical network (ASON), the ASON comprising at least three control domains (CDs), each of the CDs comprising one speaker node, the ASON further comprising at least two levels, a first level network being located on a bottom level of the ASON, a second level network being located on a level above the first level network, the first level network comprising at least two of the CDs, each of the CDs of the first level network comprising nodes, the second level network comprising at least one of the CDs, each of the CDs of the second level network comprising routing controllers (RCs); and, a RC that is located within a network representing a CD of one level lower than the network, there being a one-to-one correspondence between the CD and the RC;

the method comprising:

disseminating, by each of nodes that are located within a first CD of the first level network, a node_id of each of the nodes in the first CD;

obtaining, by a speaker node of the first CD, the node_id of each of the nodes of the first CD, forming an aggregation address of the first CD, feeding aggregation address information of the first CD to a first RC of the second level network, in accordance with a one-to-one correspondence between the first CD and the first RC, and disseminating the aggregation address information of the first CD in the first CD;

disseminating, by the first RC that is located within a second CD of the second level network, the aggregation address information of the first CD in the second CD, obtaining an aggregation address of a third CD of the first level network, the third CD corresponding to a second RC that is located within the second CD, feeding aggregation address information of the third CD to the speaker node of the first CD;

disseminating, by the speaker node of the first CD, the aggregation address information of the third CD in the first CD;

obtaining, by each of the nodes of the first CD, aggregation address information that contains the aggregation address information of the first CD and the aggregation address information of the third CD, forming a reachable address list;

determining a first endpoint node and a second endpoint node that are located within a traffic engineering (TE) link of the first level network, searching for a RC ID and another RC ID by using a reachable address list of the first endpoint node, the RC ID corresponding to an aggregation address that contains a second endpoint node address and belonging to a CD of the lowest level network, the another RC ID corresponding to an aggregation address that contains a first endpoint node address and belonging to the CD of the lowest level network; and determining that the TE link is an external link if the RC ID is different from the another RC ID, and determining that the TE link is an internal link if the RC ID is the same as the another RC ID;

wherein the speaker node disseminates the aggregation address information of the first CD in the first CD comprising:

adding a top-level type-length-value (TLV) that attaches the aggregation address information in No. 10 link state advertisement of a routing protocol the top-level TLV comprising one sub-TLV for identifying attribute and parameter information and at least one sub-TLV for identifying address information; wherein the attribute and parameter information comprise network element ID, level number, a flag to show whether it is a DDRP node, RC ID of a node, area ID of a domain to which the current RC belongs, and the address information comprise storing a node_id information, address length; and disseminating the aggregation address information by using the No. 10 link state advertisement of the routing protocol.

8. The method according to claim 7, wherein the ASON comprises a third level network, the third level network located on a top level of the ASON, the third level network comprises at least one of the CDs, and each of the CDs of the second level network comprises RCs;

the method further comprising:

obtaining, by a speaker node of the second CD, an aggregation address of each of RCs that are located within the second CD, feeding aggregation address information of the second CD to a third RC of the third level network, in accordance with a one-to-one correspondence between the second CD and the third RC;

disseminating, by the third RC that is located within a fourth CD of the third level network, the aggregation address information of the second CD in the fourth CD, obtaining an aggregation address of a fifth CD of the second level network, the fifth CD corresponding to a fourth RC that is located within the fourth CD, feeding aggregation address information of the fifth CD to the speaker node of the second CD.

9. The method according to claim 7, wherein the source node searches for the RC ID and the another RC ID.

\* \* \* \* \*

UNITED STATES PATENT AND TRADEMARK OFFICE
CERTIFICATE OF CORRECTION

PATENT NO. : 7,782,798 B2
APPLICATION NO. : 11/571520
DATED : August 24, 2010
INVENTOR(S) : Huiying Xu It is certified that error appears in the above-identified patent and that said Letters Patent is hereby corrected as shown below:

Column 16, claim 7, line 63, after the word "protocol" insert a --,--.

Signed and Sealed this

Twelfth Day of October, 2010

David J. Kappos
*Director of the United States Patent and Trademark Office*